United States Patent [19]
Pluess et al.

[11] Patent Number: 5,456,865
[45] Date of Patent: Oct. 10, 1995

[54] MATTER-CONDUCTIVE CROWN ELEMENT FOR THE PACKING OF A MATTER-EXCHANGE COLUMN

[75] Inventors: Raymond C. Pluess, Kleinandelfingen; Philipp Süess, Neftenbach, both of Switzerland

[73] Assignee: Sulzer Chemtech AG, Winterthur, Switzerland

[21] Appl. No.: 160,527

[22] Filed: Dec. 1, 1993

[30] Foreign Application Priority Data

Dec. 2, 1992 [EP] European Pat. Off. .............. 92810942

[51] Int. Cl.⁶ ................. B01D 3/00; B01J 19/32
[52] U.S. Cl. ................. 261/112.1; 261/112.2; 261/DIG. 72
[58] Field of Search ............. 261/112.2, 112.1, 261/DIG. 41, DIG. 72, 97, 110

[56] References Cited

U.S. PATENT DOCUMENTS

| | | | |
|---|---|---|---|
| 3,195,701 | 4/1962 | Brazelton | 261/112.2 |
| 4,096,214 | 6/1978 | Percevaut et al. | 261/112.1 |
| 4,186,159 | 1/1980 | Huber | 261/112.1 |
| 5,224,351 | 7/1993 | Jeannot et al. | 261/152 |

FOREIGN PATENT DOCUMENTS

| | | | |
|---|---|---|---|
| 0491591 | 6/1992 | European Pat. Off. . | |
| 2637059 | 3/1990 | France . | |
| 1086215 | 2/1959 | Germany | 261/97 |
| 8700639 U | 4/1987 | Germany . | |
| 982740 | 12/1992 | U.S.S.R. | 261/97 |
| 929030 | 6/1963 | United Kingdom | 261/97 |

*Primary Examiner*—Khanh P. Nguyen
*Attorney, Agent, or Firm*—Townsend and Townsend and Crew

[57] ABSTRACT

The crown element (3) for the packing (2) of a matter-exchange column (1) in the exchange part (2) of which in particular a gas flowing upwards and a liquid flowing in contraflow are brought into contact, serves for the guidance of these flows of matter. An annular gap (12) lying between the packing and the column wall (10) is largely roofed over by parts (30) of the crown element in the form of tabs. In accordance with the invention the crown element (3) is a separate component which exhibits the following features: regions (31) of the crown element which define a surface for making contact with the packing (2); the roofing-over parts (30) are connected with springy elasticity to the regions (31) touching the packing; and the profile of the cross-section of the crown element exhibits a radial dimension which enables fixing of the crown element in the annular gap (12) because of spring and frictional forces. The column may be equipped with collar elements at favorable cost by the invention.

14 Claims, 3 Drawing Sheets

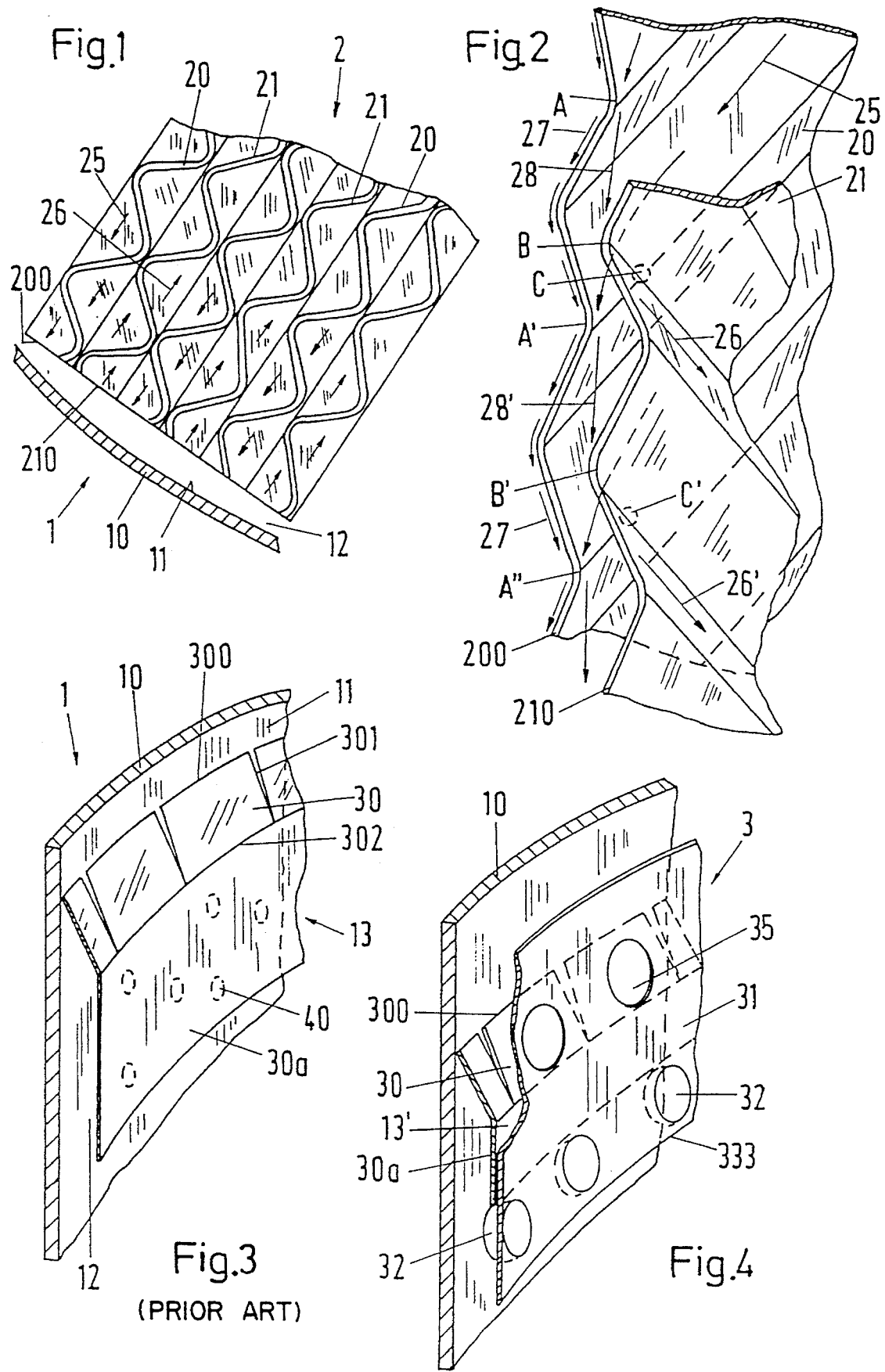

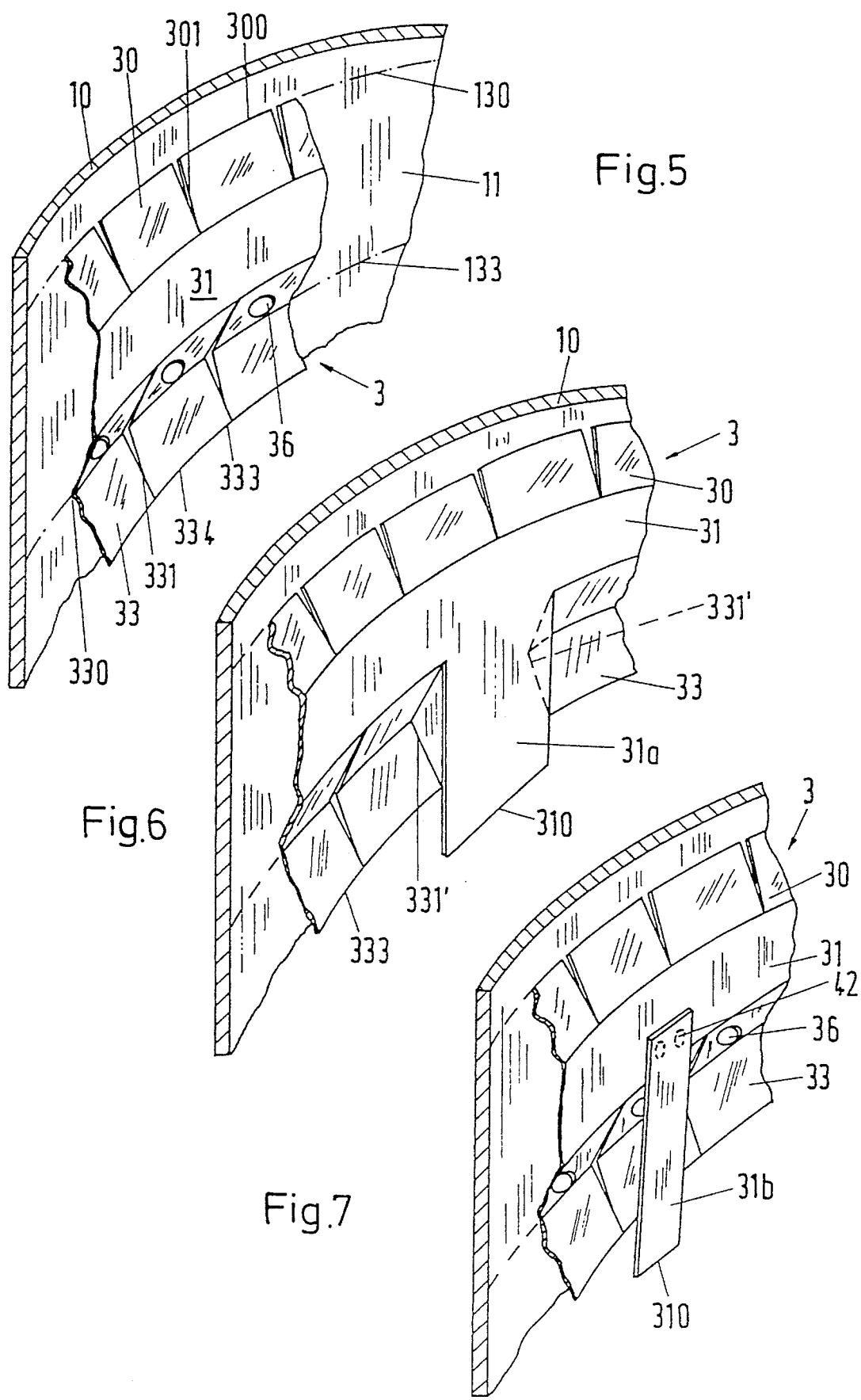

5,456,865

MATTER-CONDUCTIVE CROWN ELEMENT FOR THE PACKING OF A MATTER-EXCHANGE COLUMN

BACKGROUND OF THE INVENTION

The invention is concerned with a matter-conductive crown element for the packing of a matter-exchange column. The invention is also concerned with a matter-exchange column having crown elements of that kind.

The exchange part of such a column in which in particular an upwards flowing gas (steam) and a counter-flowing liquid are brought into contact, consists of a packing which fills the cross-section of the column out to an annular gap at the column wall. The crown elements which encircle the packing serve for the deflection of these flows of matter. The gas flow is forced into the packing by the crown elements; the gas is thereby impeded from partially flowing through along the region at the edge of the column without coming into contact with the liquid. The packing is in particular an ordered packing which brings about a distribution of the two flows of matter across the cross-section of the column.

The packing is composed, for example, of layers of undulating laminations or laminations folded in a zigzag. The laminations consist of a material like foil; the edges at the folds or ridges extend in a direction inclined with respect to the axis of the column, for example, at an angle to the axis amounting of 45° or 30°. The layers formed by the laminations are aligned in parallel with the axis; with respect to the slope of the edges at the folds they are arranged alternately so that open channels result which run obliquely and cross. The packing is organized in sections which differ in the orientation of the layering. Between adjacent sections the orientation changes each time through 90°.

Through the oblique channels in the packing, part of the liquid flows to the region at the edge. To prevent this liquid from contacting the column wall an edge gap is provided, that is, the above-mentioned annular gap. Without the edge gap a considerable part of the liquid would flow down along the column wall.

By means of the edge gap it becomes possible for the liquid arriving at the edge of the packing to be returned into the interior of the packing again through other channels. However, it cannot be avoided in practice that a certain proportion of the liquid does spill over against the column wall and thereby impair the matter-exchange process. The crown elements have the additional function of conducting the liquid back from the column wall to the packing where the liquid is subsequently led through some of the channels back into the interior of the packing.

Further examples of ordered packings which bring about a distribution of the two flows of matter across the cross-section of column, are described in the European Patents 0 070 917 and 0 069 241.

U.S. Pat. No. 4,186,159 or CH-PS 618 006 disclose a crown element for a packing which is there designated as a "collar". The description of the FIG. 8 shown there reads as follows (quotation): To the bottom parts of the built-in elements (here called portions of packing) diverter elements made as collars are fastened, which seal the annular gap between the packing body and the column wall and cause the liquid flowing down the inner wall to be conducted inwards against the underside of each built-in element. Such collars may also be arranged at various heights of the built-in elements.

One single portion of packing of the matter-exchange column may consist of one coherent built-in element; it may—especially in the case of columns of large diameter— also be composed of a number of segments. For simple mounting of the column it is necessary for the collars to be fastened to the built-in elements or segments already before installing the packing. Since the packing consists of thin-walled material, the fastening of the collars, which may be done by welding (but also by screwing or riveting) is an expensive manufacturing step.

SUMMARY OF THE INVENTION

The problem of the invention is to find with respect to the installation of the collars a solution which is less costly. This problem is solved by crown elements which have the function of collars and have a center part positioned inside the wall of the exchange column which forms a surface for contacting and mounting the packing. It is dimensioned so that the part is spaced from the tubular, e.g. cylindrical, wall. Bridging elements extend from the part at an oblique angle relative to the part so that a free edge of the bridging elements defines a transverse dimension, e.g. have an outside diameter which is greater than the inside diameter of the wall. Extensions are further joined to the part, are axially spaced from the bridging elements, and extend away from the part towards the wall. They define a plurality of contact points distributed along the wall and which also have a transverse dimension, e.g. which lie on an outside diameter which is greater than the inside diameter of the wall. The bridging elements and the extensions are constructed of a flexible, resiliently movable material so that, upon placement of the crown inside the exchange column, the elements and the extensions apply outwardly directed, axially spaced forces which generate friction and thereby secure the crown to the wall. The column may be equipped with collar elements by the invention in a manner favorable to cost.

BRIEF DESCRIPTION OF THE DRAWINGS

FIG. 1 is a detail of a cross-section of column with one part of a packing segment;

FIG. 2 is a detail of a packing in perspective;

FIG. 3 is part of a known collar separated from the packing;

FIG. 4 corresponds to FIG. 3, and shows a first embodiment of the crown element in accordance with the invention;

FIGS. 5–7 show further embodiments of the invention;

DESCRIPTION OF THE PREFERRED EMBODIMENTS

Figure 8A:
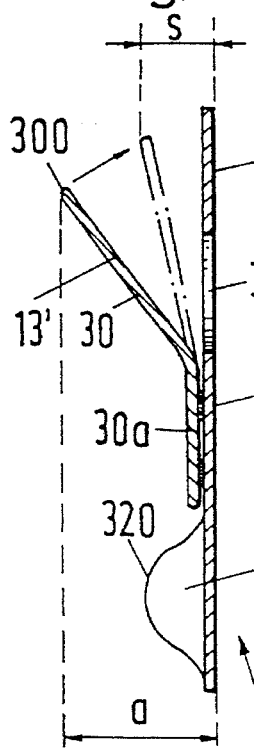
FIGS. 8a–d are cross-sectional profiles of the crown elements which are represented in FIGS. 4–7.
Figure 8B:
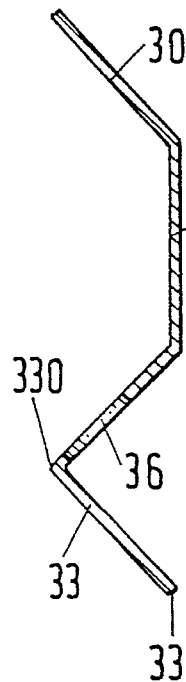
Figure 8C:
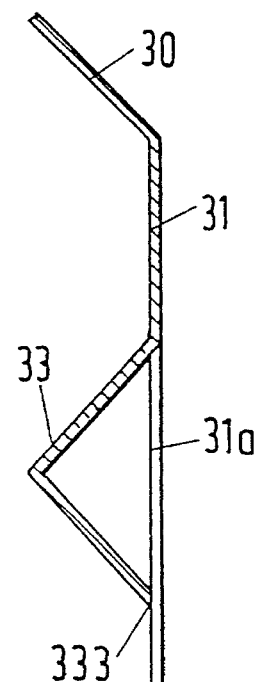
Figure 8D:
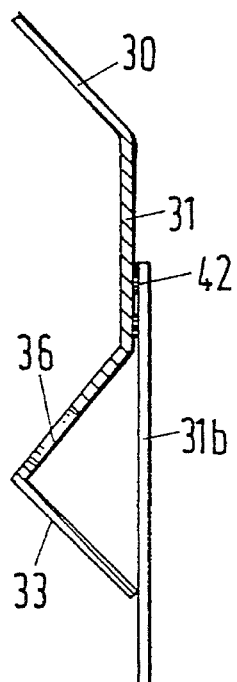

FIG. 1 shows part of the annular or edge gap 12 which lies between the wall 10 of the matter-exchange column 1 and the packing 2. The packing layers are composed of laminations 20 and 21 folded in a zigzag, conduct the liquid in the direction of arrows 25 from the interior of the packing to the edge which is formed by edges 200 and 210 of the laminations, or respectively in the reverse direction in accordance with arrows 26. The conditions at the edge of the packing are illustrated by FIG. 2. The partially shown laminations 20 and 21 touch at points C and C' and have a film of liquid trickling over them. Through the liquid conducted outwards over the lamination 20 (arrow 25) a stronger flow of liquid is formed at the edge 200, as indicated by the arrows 27. Part of this flow 27 changes over at the projections A, A', A" onto the edge 210 of the adjacent lamination 21—to points B, B'—(arrows 28, 28') where the liquid is subsequently conducted back into the interior of the packing (arrows 26, 26'). If contact between the packing 2 and the column wall 10 had existed, the liquid conducted to the edge would have had the tendency to flow along the inner wall 11.

It has already been pointed out at the beginning that gas flow obstructions have to be provided in the edge gap. Such obstructions take the form of collars which are fastened to the edge of the packing. In FIG. 3 a known collar 13 is shown in perspective separated from the packing—but nevertheless arranged at its point of use against the column wall 10. The points 40 where the connection has been severed are indicated by dotted circles. The collar 13 may be produced very simply from a strip of foil by incisions at the side so that between the incisions 301 parts 30 arise in the form of tabs by which through folding along the line 302 it is possible very largely to roof over the edge gap 12. Over that part 30a of the foil strip which has no incisions the collar 13—in the case of known columns—is welded to the packing screwed or riveted). The liquid which arrives at the column wall is conducted back again to the packing by the roofing-over parts 30 which at the outer edges 300 are in contact with the wall 10.

As distinct from the known collars 13 the crown element 3 of the invention is a separate component which is not fastened to the edge of the packing and is held firmly in the edge gap 12 between the column wall 10 and the packing 2 by spring and frictional forces. Four embodiments of the crown element 3 are represented in FIGS. 4–7 (perspectives) and in FIGS. 8a–8d (corresponding cross-sectional profiles).

In the case of the first embodiment, FIG. 4, the crown element 3 the invention is composed of two parts, namely, a part 13' and a part 31. The part 13' has essentially the same form as the known collar 13. The part 31 is a piece of a strip of foil which exhibits knob-like elevations or extensions 32 and openings 35. The openings 35 permit the liquid which is being conducted away from the column wall 10 by the roofing-over parts or bridging elements to pass through to the packing. Since the transmission of force is effected through the parts 30 between the column wall 10 and the crown element 3 in the upper region of the crown element 3, a tilting moment develops which might prevent the bottom region of part 31 from touching the packing; the conveyance of the liquid back to the packing would thus be impaired. The knob-like elevations 32 maintain a spacing between bottom edge 333 of the crown element 3 and wall 10, so that liquid from this edge 333 does not flow onto the wall and instead drips off the edge and runs over into the packing again. In contrast to the known collar 13, the roofing-over parts 30 of the invention must be connected to the remaining parts of the crown element 3 with springy elasticity, that is, in such a way that the crown element 3 lies in the edge gap 12 in a stressed state so that it is maintained in its desired position.

In the case of the second embodiment, shown in FIG. 5, the crown element 3 of the invention consists of only one part. The transmission of force to the column wall 10 is effected along the lines 130 and 133 on the inner wall 11 at one side via edges or extensions 300 of the roofing-over parts 30 and at the other side via the edges 330 at the fold. These edges or extensions 330 are formed by folded parts 33 in the lower region of the crown element 3, which as boundaries exhibit at the top a line of fold 332 and at the sides incisions 331. It is to be observed that the incisions 331 do not continue as far as the bottom edge 333 but a small piece 334 is provided there which is not cut through. It is also possible—at the cost, however, of the stability of the crown element 3—to let these incisions 331 run right to the edge 333. Liquid can pass through the wedge-shaped openings at the incisions 301 between the roofing-over parts 30; this liquid is caught by the edge 330 at the fold and conducted through the openings 36 to the packing. Between the roofing-over parts 30 and the folded parts 33 lies the region 31 touching the packing, via which at least part of the transmission of force between the crown element 3 and the packing is effected. (A second part of the transmission of force may be effected via the edge 333).

The mounting of the packing is performed section by section. In doing so, for example, on the previously built-in section of packing first of all the crown elements 3 are distributed along the circumference of the cross-section of the column. The following section of the packing is then pushed into the ring of crown elements 3 (in one piece or in segments), in doing which the crown elements 3 are pressed against the column wall 10. In the case of the second embodiment of the crown element 3 it may now happen that the bottom edge 333 at the joint between the sections of packing does not become completely pushed out into the edge gap 12. A small void thereby arises at the joint, which may cause trouble. The occurrence of such a void between the sections of packing may be avoided by the embodiments of FIGS. 6 and 7.

The embodiment in accordance with FIG. 6 is a variant upon the second embodiment, in which in the bottom region of the crown element 3 at least one part 31a is left straight (so that here the incisions 331' lead to the edges 333, 310). The bottom edge 310 of this part 31a, which is part of regions 31 touching the packing, forms the lowest points of crown element 3. Since in the mounting of the packing the edge 333, thanks to the part 31a, acquires a clearance from the section of packing already built in, the problem encountered in the case of the second embodiment no longer occurs. A second solution of this problem is provided by the crown element 3 of FIG. 7. Here the clearance needed between the edge 333 and the section of packing lying below it is produced by means of at least one strip 31b which is welded on at weld points 42. This strip 31b is likewise part of the regions 31 touching the packing and its bottom edge 310 forms the lowest-lying points of the crown element 3.

FIG. 8a shows the cross-sectional profile of the crown element 3 represented in FIG. 4. The free crown element 3 exhibits a radial dimension given by the distance a. During fastening into the edge gap 12 this dimension is reduced to the gap width s. Contact with the column wall after fastening consists, besides contact via the edge 300, also of contact via the peaks 320 of the knob-like elevations 32. The two parts 13' and 31 are connected together by weld points 41. The cross-sectional profiles of FIGS. 8b to 8d correspond to the embodiments of FIGS. 5 to 7.

Figure 8E:
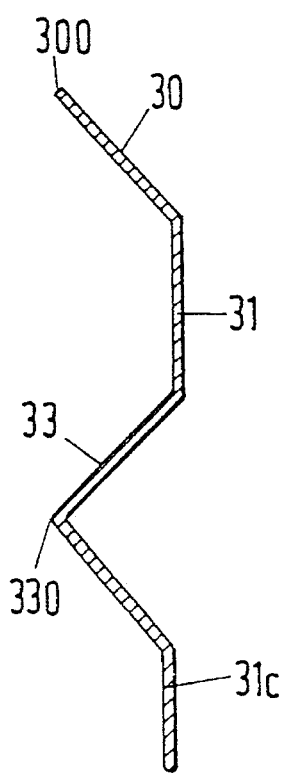
FIGS. 8e–f are cross-sectional profiles of further crown elements in accordance with the invention.
Figure 8F:
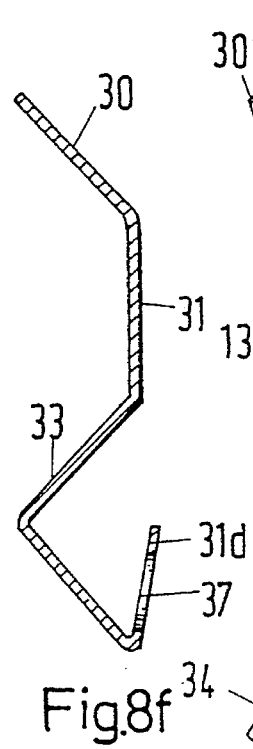

FIGS. 8e and 8f show further variants upon the second embodiment (FIGS. 5, 8b), which in each case result from a prolongation 31c or 31d in the form of a strip at the bottom edge line 333. In the case of FIG. 8f openings 37 are provided in the upwards directed prolongation 31d. No openings 36 are drawn in the folded part 33, but merely one possibility is specified by that and it does not have to mean that such openings have to be omitted. The prolongations 31c or 31d also belong to the regions 31 touching the packing.

Figure 8G:
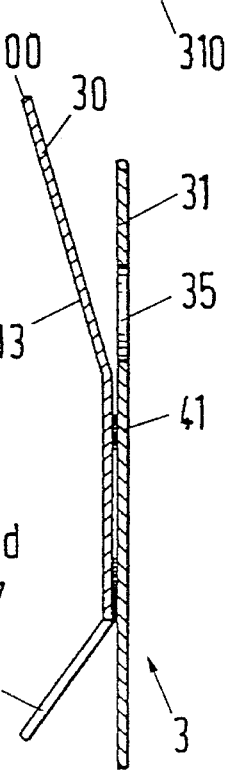
Figure 8H:
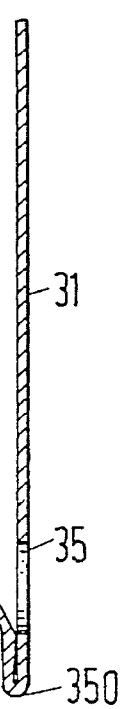

The crown element 3 of FIG. 8g is a variant upon the first embodiment (FIGS. 4, 8b), the main difference being that instead of the knobs 32 extensions 34 in the form of tabs are provided at the bottom edge of the part 13'. In the case of the crown element 3 of FIG. 8b contact with the column wall is produced via the roofing-over parts 30 only. It is again a question of a similar structure to that in the first embodiment but this pattern may be produced from one piece of strip by folding about a line 350 below the openings 35. The edge 300 is arranged in the middle region of the crown element so that practically no tilting moment occurs and hence knob-like elevations as in the case of the first embodiment are not necessary.

A matter-exchange column 1 with crown elements 3 made in accordance with the invention exhibits per section of packing at least one ring of crown elements closed over the circumference; the ring may also consist of merely one crown element. The crown elements are advantageously produced from essentially the same material as the packing. The material of the packing or crown elements preferably consists of a metal alloy. The packing represented in FIGS. 1 and 2 is to be understood merely as an example. Thus the packing may exhibit any structure which brings about a distribution of fluids being treated in directions transverse to the line of fall. The crown elements like the packing are advantageously produced from a foil-like material of which the wall thickness lies in the range between 0.05 and 1 mm, preferably at around 0.2 mm.

What is claimed is:

1. A crown for use in a matter-exchange column having a longitudinal axis and bridging a gap between a tubular wall having a transverse inside dimension and a packing disposed within the wall, the crown comprising a part for placement inside the wall forming a surface for contacting the packing and dimensioned to be placed inside the wall so that the part is spaced from the wall, bridging elements extending from the part at an oblique angle relative to the part and dimensioned so that a free edge of the bridging elements defines a transverse dimension greater than the transverse inside dimension of the wall, and extensions joined to the part, axially spaced from the bridging elements, and extending away from the part towards the wall defining a plurality of contact points distributed along the wall and defining a transverse inside dimension greater than the transverse inside dimension of the wall, the bridging elements and the extensions being constructed of a flexible material enabling resilient movement of the elements and the extensions transversely to the axis so that, upon placement of the crown inside the tubular wall, the elements and the extensions apply outwardly directed, axially spaced forces against the wall which generate friction between the elements and the extensions that secure the crown to the wall.

2. A crown according to claim 1 wherein the part is a tubular part.

3. A crown according to claim 2 wherein the wall and the part have a cylindrical shape.

4. A crown according to claim 3 wherein the bridging elements include spaced-apart slits extending from the free edge towards the part and defining spaced-apart bridging tabs.

5. A crown according to claim 1 wherein the part, the elements and the extensions are constructed of a material having a thickness in the range of between 0.05 mm and 1 mm.

6. A crown according to claim 5 wherein the thickness is about 0.2 mm.

7. A crown according to claim 1 wherein the extensions are formed by knob-shaped projections attached to the part.

8. A crown according to claim 1 wherein the part and the extensions are formed of a sheet material including a fold between and connecting the part and the extension.

9. A crown according to claim 1 wherein the part has an axial length and the bridging elements are disposed intermediate axial ends of the part, and including openings in the part positioned to permit liquid flowing along the bridging elements towards the part to pass from one side of the part to another side thereof so that such liquid can flow onto the packing.

10. A crown according to claim 1 wherein a portion of the part extends axially beyond an axial extent of the extensions so that when the crown is installed in a vertical matter-exchange column a lowermost axial edge of the crown is defined by the part.

11. A matter-exchange column comprising an upright tubular member having a longitudinal axis and a transverse inside dimension, at least one tubular crown including a part for placement inside the tubular member forming a surface for contacting the packing and dimensioned so that the part is spaced from the member when placed inside the member, bridging elements extending from the part at an oblique angle relative to the part and dimensioned so that a free edge of the bridging elements defines a transverse dimension greater than the transverse inside dimension of the member, and extensions joined to the part, axially spaced from the bridging elements, and extending away from the part towards the member defining a plurality of contact points distributed along the member and defining a transverse dimension greater than the transverse inside dimension of the member, the bridging elements and the extensions being constructed of a flexible material enabling resilient movement of the elements and the extensions transversely to the axis so that, upon placement of the crown inside the member, the elements and the extensions apply outwardly directed, axially spaced forces against the member which generate friction between the elements and the extensions that secure the crown to the member, and a packing disposed in an inner space of the crown defined by the part.

12. A matter-exchange column according to claim 11 wherein the column comprises one crown only.

13. A matter-exchange column according to claim 11 wherein the at least one crown and the packing are constructed of the same material.

14. A matter-exchange column according to claim 13 wherein the material of the crown and the packing comprise a metal alloy.

* * * * *